(12) United States Patent
Wu et al.

(10) Patent No.: US 11,894,569 B2
(45) Date of Patent: Feb. 6, 2024

(54) FIXING ASSEMBLY FOR BATTERY MODULE AND BATTERY PACK

(71) Applicants: Shenzhen Hithium Energy Storage Technology Co., Ltd., Guangdong (CN); Xiamen Hithium Energy Storage Technology Co., Ltd., Fujian (CN)

(72) Inventors: Tingting Wu, Fujian (CN); Junmin Feng, Fujian (CN); Wancai Zhang, Fujian (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/967,370

(22) Filed: Oct. 17, 2022

(65) Prior Publication Data

US 2023/0036936 A1    Feb. 2, 2023

Related U.S. Application Data

(63) Continuation of application No. PCT/CN2021/080275, filed on Mar. 11, 2021.

(30) Foreign Application Priority Data

Jul. 28, 2020   (CN) .......................... 202021522969.2

(51) Int. Cl.
*H01M 50/264*   (2021.01)
*H01M 50/593*   (2021.01)
(Continued)

(52) U.S. Cl.
CPC ....... *H01M 50/264* (2021.01); *H01M 50/209* (2021.01); *H01M 50/593* (2021.01); *H01M 50/595* (2021.01)

(58) Field of Classification Search
CPC ......................... H01M 50/264; H01M 50/593
See application file for complete search history.

(56) References Cited

U.S. PATENT DOCUMENTS

2021/0336308 A1    10/2021  Wang et al.
2022/0115730 A1*   4/2022   Chen .................. H01M 50/289

FOREIGN PATENT DOCUMENTS

CN    206742341 U    12/2017
CN    206976456 U    2/2018
(Continued)

OTHER PUBLICATIONS

CNIPA, International Search Report for International Patent Application No. PCT/CN2021/080275, dated May 31, 2021, 8 pages.
(Continued)

*Primary Examiner* — Jane J Rhee
(74) *Attorney, Agent, or Firm* — IP Spring

(57) ABSTRACT

A fixing assembly for a battery module and a battery pack are provided. The fixing assembly for the battery module includes an end plate, a fixing member, and a first band. The end plate is provided with a limiting member protruding from a surface of the end plate. The fixing member is configured to connect multiple battery modules and abut against the surface of the end plate provided with the limiting member, such that the fixing member, the limiting member, and the end plate can cooperatively define a positioning region. The first band is configured to abut against the surface of the end plate provided with the limiting member to bind the battery module. The first band abuts against the positioning region, such that the fixing (Continued)

member and the limiting member can cooperatively abut against the first band.

20 Claims, 2 Drawing Sheets

(51) Int. Cl.
*H01M 50/209* (2021.01)
*H01M 50/595* (2021.01)

(56) References Cited

FOREIGN PATENT DOCUMENTS

| CN | 207441881 U | | 6/2018 | | |
|---|---|---|---|---|---|
| CN | 208422982 U | | 1/2019 | | |
| CN | 109671889 A | | 4/2019 | | |
| CN | 209357794 U | | 9/2019 | | |
| CN | 209496931 U | | 10/2019 | | |
| CN | 210040326 U | | 2/2020 | | |
| CN | 210073967 U | | 2/2020 | | |
| CN | 210200839 U | | 3/2020 | | |
| CN | 210535723 U | * | 5/2020 | ......... | H01M 50/209 |
| CN | 212659640 U | | 3/2021 | | |
| JP | 2008282582 A | | 11/2008 | | |
| JP | 4593057 B2 | | 12/2010 | | |
| WO | WO-2012009145 A2 | * | 1/2012 | ............ | B60L 50/64 |

OTHER PUBLICATIONS

CNIPA, Written Opinion for International Patent Application No. PCT/CN2021/080275, dated May 31, 2021, 11 pages.
USPTO, Non-final Office Action for corresponding U.S. Appl. No. 17/968,799, filed Feb. 28, 2023, 26 pages.
USPTO, Final Office Action for corresponding U.S. Appl. No. 17/968,799, filed Jun. 26, 2023, 17 pages.
CNIPA, International Search Report and Written Opinion for corresponding International Patent Application No. PCT/CN2021/108690, dated Oct. 26, 2021, 25 pages.

* cited by examiner

FIXING ASSEMBLY FOR BATTERY MODULE AND BATTERY PACK

CROSS-REFERENCE TO RELATED APPLICATION(S)

This application is a continuation under 35 U.S.C. § 120 of International Application No. PCT/CN2021/080275, filed Mar. 11, 2021, which claims priority under 35 U.S.C. § 119(a) and/or PCT Article 8 to Chinese Patent Application No. 202021522969.2, filed Jul. 28, 2020. The entire disclosures of International Patent Application No. PCT/CN2021/080275 and Chinese Patent Application No. 202021522969.2 are incorporated herein by reference.

TECHNICAL FIELD

This disclosure relates to the field of batteries, and in particular, to a fixing assembly for a battery module and a battery pack.

BACKGROUND

During fixing of a battery module, multiple battery cells are fixed mainly through a front end plate and a back end plate, and then the battery module is fixed by binding and fixing with a band.

In the related art, a battery cell may expand or shrink, which may result in expansion or shrinkage of the battery module, and thus after long-term use, the band may be easy to fall off.

SUMMARY

A fixing assembly for a battery module is provided in implementations of the present disclosure. The fixing assembly for the battery module may include an end plate, a fixing member, and a first band. The end plate may be configured to abut against an outer sidewall of the battery module and provided with a limiting member protruding from a surface of the end plate. The fixing member may be configured to connect multiple battery modules and abut against the surface of the end plate provided with the limiting member, such that the fixing member, the limiting member, and the end plate can cooperatively define a positioning region. The first band may be configured to abut against the surface of the end plate provided with the limiting member to bind the battery module. The first band may abut against the positioning region, such that the fixing member and the limiting member cooperatively abut against the first band.

A battery pack is provided in the present disclosure. The battery pack may include multiple battery modules, multiple end plates, a fixing member, and multiple first bands. An end plate may abut against an end portion of a battery module and may be provided with a limiting member at a side of the end plate away from the battery module. The fixing member may abut against the side of the end plate away from the battery module and be connected with the multiple battery modules. The fixing member, the limiting member, and the end plate may cooperatively define a positioning region. A first band may be configured to bind the battery module. The first band may be adapted to the positioning region, such that the fixing member and the limiting member can cooperatively limit a movement of the first band.

BRIEF DESCRIPTION OF THE DRAWINGS

In order to explain technical solutions in implementations of the present disclosure more clearly, the following will give a brief introduction to accompanying drawings which are needed to be used in description of implementations or the related art. It should be understood that followings accompanying drawings only illustrate some implementations of the present disclosure and thus should not be considered as limitation to the scope. For those of ordinary skill in the art, other accompanying drawings can be obtained according to these accompanying drawings without creative efforts.

Figure 1:
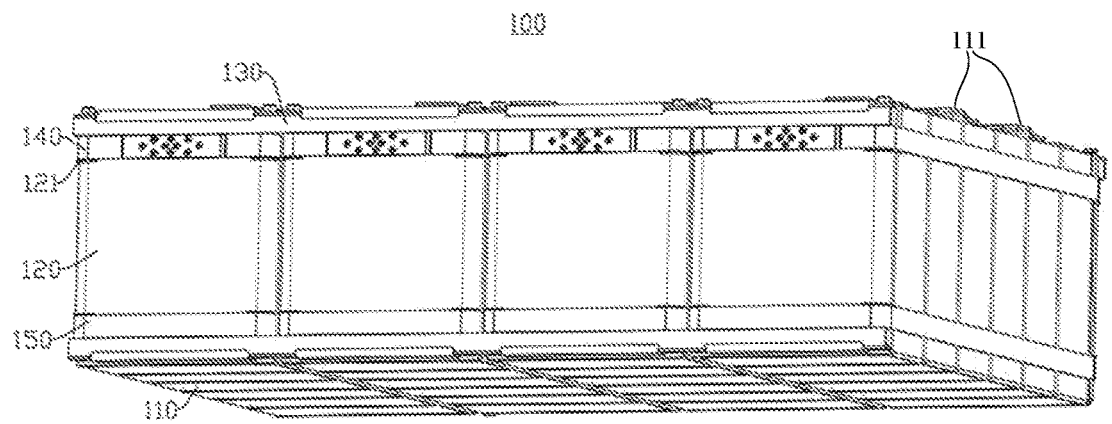
FIG. 1 is a schematic structural diagram of a battery pack provided in implementations of the present disclosure.

Reference signs: 100—battery pack; 101—positioning region; 110—battery module; 111—electrode; 120—end plate; 121—limiting member; 130—fixing member; 131—main body; 132—connecting portion; 140—first band; 150—second band.

DETAILED DESCRIPTION

In order to make a purpose, a technical solution, and an advantage of implementations of the present disclosure clearer, the technical solution of implementations of the present disclosure will be described clearly and completely in conjunction with accompanying drawings in implementations of the present disclosure. Obviously, described implementations are part of implementations of the present disclosure, not all of implementations. Generally, the assemblies of implementations of the present disclosure, which are described and illustrated in the accompanying drawings herein, may be arranged and designed in a variety of different configurations.

Therefore, the detailed description of implementations of the present disclosure provided in the accompanying drawings is not intended to limit the claimed scope of the present disclosure, but illustrates only the selected implementations of the present disclosure. All other implementations, obtained by those of ordinary skill in the art in light of implementations of the present disclosure without inventive efforts, will all fall within the claimed scope of the present disclosure.

It should be noted that similar signs and letters indicate similar items in the following accompanying drawings, and therefore, once an item is defined in an accompanying drawing, it is not necessary to further define or explain it in the subsequent accompanying drawings.

In the description of implementations of the present disclosure, it should be understood that orientation or positional relations indicated by terms such as "up", "down", etc., are orientation or positional relations based on the accompanying drawings, or orientation or positional relations in which the application product is placed conventionally in use, or orientation or positional relations commonly understood by those of ordinary skill in the art, only for facilitating description of the present disclosure and simplifying the description, rather than indicating or implying that the referred devices or elements must be in a particular orientation or constructed or operated in the particular orientation, and therefore they should not be construed as limiting the present disclosure.

In addition, terms such as "first", "second", "third", etc., are used only for distinguishing illustration, and should not be construed as indicating or implying relativity importance.

In the description of the present disclosure, it should be indicated that unless otherwise expressly specified or defined, terms such as "disposed", "arranged", "provided with", "mount", "couple", and "connect" should be understood broadly, and for example, a fixed connection, or a detachable connection, or an integrated connection; and may be a direct connection, or an indirect connection via an intermediate medium, or may be an internal communication between two elements. The specific meanings of the above-mentioned terms in the present disclosure could be understood by those of ordinary skill in the art according to specific situations.

FIG. 1 is a schematic structural diagram of a battery pack 100 provided in implementations of the present disclosure. Referring to FIG. 1, the battery pack 100 may include four battery modules 110. It should be noted that in other implementations of the present disclosure, the battery pack may include two, three, five, or more battery modules 110, and the number of battery modules 110 in the battery pack 100 is not limited in the present disclosure. Accordingly, the number of battery cells contained in each battery module 110 is also not limited in the present disclosure.

In the present disclosure, the battery pack 100 may mainly include the battery modules 110, an end plate 120, a fixing member 130, and a first band 140. The battery module 110 may be implemented as multiple battery modules 110, and the end plate 120 may be implemented as multiple end plates 120. In implementations, the number of the multiple battery modules 110 may correspond to the number of the multiple end plates 120, and each end plate 120 may abut against an outer sidewall of one battery module 110. Optionally, the battery module 110 has an outer sidewall at the front end and an outer sidewall at the back end, and the outer sidewall at the front end abuts against one end plate 120 and the outer sidewall at the back end abut against one end plate 120. In implementations, for example, the end plate 120 abuts against the front end of the battery module 110.

Figure 2:
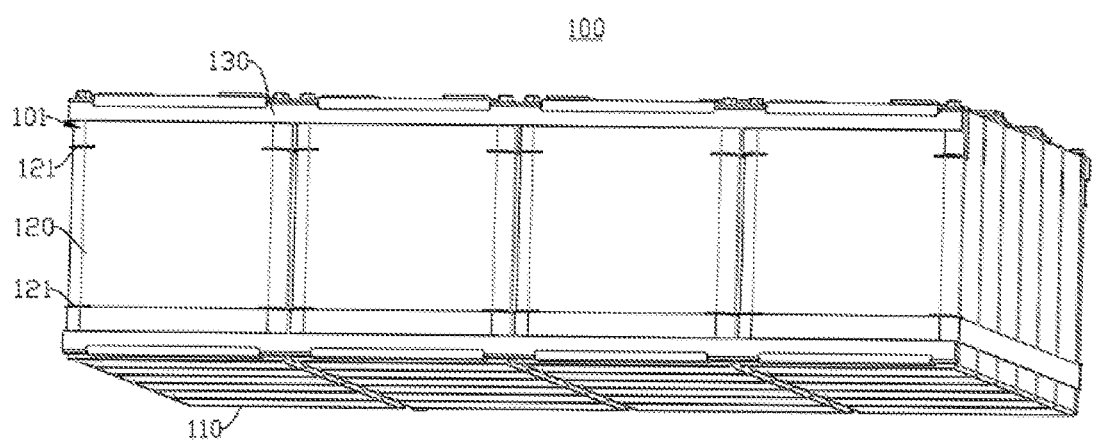
FIG. 2 is a partial schematic structural diagram of a battery pack provided in implementations of the present disclosure.

The fixing member 130 is mainly used to connect the multiple battery modules 110. In other words, the multiple battery modules 110 each are connected with the fixing member, such that the multiple battery modules 110 are connected in series to form the battery pack 100. When the multiple battery modules 110 are connected with the fixing member 130, the fixing member 130 abuts against the multiple end plates 120. For each of the multiple end plates 120, the end plate 120 is provided with a limiting member 121 protruding from the end plate 120, and the limiting member 121, a side of the fixing member 130, and the end plate 120 cooperatively define a positioning region 101 (as illustrated in FIG. 2). The first band 140 is mainly used to bind multiple battery cells, and one battery module 110 corresponds to one first band 140. The first band 140 wraps around the battery module 110 to bind the battery module 110. The first band 140 is annularly disposed at the outside of the battery module 110 and the end plate 120 to bind, and the first band 140 is adapted to the positioning region 110, such that the limiting member 120 and the fixing member 130 cooperatively limit the first band 140 to avoid a movement of the first band 140.

Reference can be made to FIG. 2, which is partial schematic structural diagram of a battery pack 100 provided in implementations of the present disclosure, and no first band 140 is illustrated in FIG. 2. In implementations, the end plate 120 may be plate-shaped, the end plate 120 may abut against an end portion of the battery module 110, and the end plate 120 may be provided with the limiting member 121. In implementations, for a better fit of the end plate 120 and the battery module 110, the end plate 120 may have a chamfer recessed toward the battery module 110 at each of two opposite sides of the end plate 120. In other words, the two opposite sides of the end plate 120 are arc-shaped, through which the end plate 120 fits the battery module 110 at the chamfer of the end plate 120.

In implementations, the limiting member 121 may be disposed at the chamfer of the end plate 120. The first band 140 abuts against the limiting member 121. The limiting member 121 at the chamfer can limit the movement of the first band 140 from two directions.

Optionally, in implementations, the end plate 120 may be provided with the limiting member 121 at each of two chamfers. It can be understood that in other implementations, the end plate 120 may be provided with the limiting member 121 only at one chamfer.

Alternatively, in other implementations of the present disclosure, the end plate 120 may have no chamfer. Accordingly, the limiting member 121 may also be not disposed at the chamfer, and the limiting member 121 may be disposed at other locations such as the middle of end plate 120.

In implementations, the limiting member 121 is elongated, and the limiting member 121 may be integrated with the end plate 120. When the first band 140 is connected with the end plate 120, the limiting member 121 may extends in a direction parallel to a direction in which the first band 140 extends. In other words, when the first band 140 is connected with the end plate 120, the limiting member 121 may be parallel to the first band 140. One of functions of the limiting member 121 is to avoid the movement of the first band 140. The limiting member 121 is parallel to the first band 140, such that there are multiple contact points between the limiting member 121 and the first band 140, or the limiting member 121 is in line contact or in surface contact with the first band 140, which increases a limiting ability of the limiting member 121 to the first band 140.

Optionally, in implementations of the present disclosure, in a direction perpendicular to the end plate 120, a height of the limiting member 121 may be equal to a thickness of the first band 140. When the first band 140 is in contact with the limiting member 121, a top of the limiting member 121 does not exceed the surface of the first band 140, which avoids that an excessive space is occupied by the top of the limiting member 121 and realizes a batter limiting effect.

It should be noted that in other implementations of the present disclosure, in the direction perpendicular to the end plate 120, the height of the limiting member 121 may also be larger than the thickness of the first band 140; or in the direction perpendicular to the end plate 120, the height of the limiting member 121 may also be smaller than the thickness of the first band 140. Accordingly, the limiting member 121 may extend in the direction which is not parallel to the direction in which the first band 140 extends. For example, a certain angle may be defined between an extension direction of the limiting member 121 and an extension direction of the first band 140, as long as the first band 140 can be accommodated in the positioning region 101 which is defined between the limiting member 121 and the fixing member 130.

In addition, in other implementations of the present disclosure, the limiting member 121 may be in other shapes, such as multiple protrusions spaced apart from one another. When the first band 140 is connected with the end plate 120, the multiple protrusions each abut against the first band 140.

The protrusion may be, for example, implemented as one, two or more protrusions. Accordingly, the limiting member 121 may be connected with the end plate 120 by welding or other manners.

Reference can be made to FIG. 2 again, the limiting member 121 and two opposite ends of the fixing member 130 define the positioning region 101 on the end plate 120, and a width of the positioning region 101 is adapted to a width of the first band 140, such that the limiting member 121 and the fixing member 130 both abut against the first band 140, which avoids a displacement and a movement of the first band 140.

Figure 3:
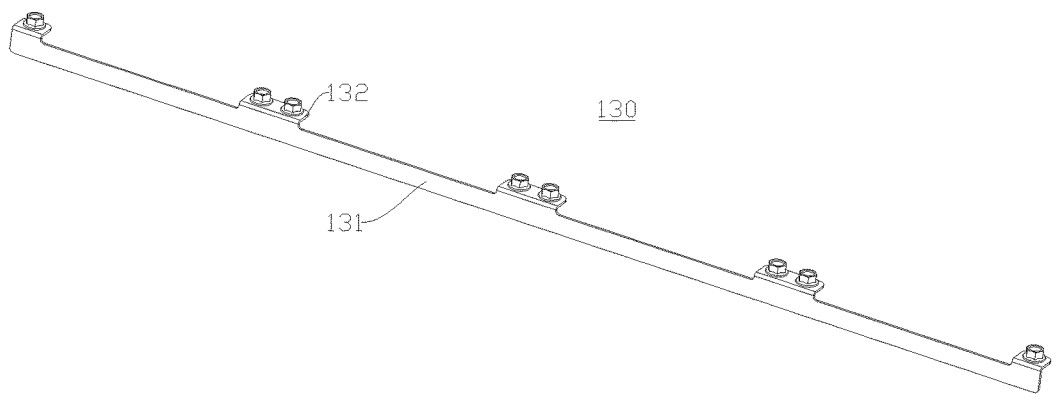
FIG. 3 is a partial schematic structural diagram of a fixing member provided in implementations of the present disclosure.

Reference can be made to FIG. 3, which is a schematic structural diagram of a fixing member 130 provided in implementations of the present disclosure. The fixing member 130 is mainly used to connect the multiple battery modules 110 and abut against one side of the first band 140.

In implementations, the fixing member 130 may include a main body 131 and multiple connecting portions 132 connected with the main body 131 at intervals. Each of the multiple connecting portions 132 may be configured to connect two adjacent battery modules 110. Two opposite ends of the connecting portion 132 may be connected with two battery modules 110 respectively, and the two battery modules 110 are connected with each other through the connecting portion 132. The main body 131 can abut against the first band 140 to avoid the movement of the first band 140, and the main body 131 can also connect the multiple battery modules 110 to avoid displacements among the multiple battery modules 110. In detail, when the multiple battery modules 110 are connected with one another through the multiple connecting portions 132, one end of each of the multiple battery modules 110 can abut against the main body 131, such that the multiple battery modules 110 are flush with one side of the main body 131, and end surfaces of the multiple battery modules 110 are almost on the same plane, which avoids mutual dislocations or movements among the multiple battery modules 110.

In implementations of the present disclosure, the number of connecting portions 132 may be set according to the number of battery modules 110. For example, if there are two battery modules 110, one connecting portion 132 is disposed, and if there are three battery modules 110, two connecting portions 132 are disposed to connect the three battery modules 110. The connecting portion 132 may be connected with the battery module 110 by welding, bolting, etc.

In implementations, the main body 131 may be elongated. When the fixing member 130 is connected with the battery module 110, the main body 131 may be parallel to the first band 140, such that the first band 140 can be in surface contact with the main body 131, which makes the fixing member 130 and the limiting member 121 have a relatively great limiting effect on the first band 140.

It should be noted that in other implementations of the present disclosure, the main body 131 may be in other shapes, for example, the main body 131 is a bent strip-shaped sheet. when the fixing member 130 is connected with the battery module 110, at least part of the main body 131 abuts against the first band 140.

In implementations, the connecting portion 132 may be connected with an end portion of the main body 131, the main body 131 may fit the surface of the end plate 120, the connecting portion 132 may fit the battery module 110, such that a space between the fixing member 130 and the battery module 110 can be reduced.

In implementations, the thickness of the main body 131 may be almost equal to the thickness of the first band 140. The main body 131 may be in surface contact with the end plate 120. It should be noted that in other implementations of the present disclosure, the thickness of the main body 131 may also be larger or smaller than the thickness of the end plate 120. Accordingly, the main body 131 may be in other shapes, and the main body 131 may be in contact with the end plate 120 in a manner of multi-point contact.

As mentioned above, the limiting member 121 may be parallel to the main body 131 of the fixing member 130, such that the limiting member 121, the main body 131, and the end plate 120 define one rectangular positioning region 101. In implementations, the first band 140 is also rectangular, such that the limiting member 121 and the main body 131 both abut against the first band 140 in a manner of line contact or surface contact. It can be understood that in other implementations of the present disclosure, the first band 140 may be bent, and when the bent band is accommodated in the rectangular positioning region 101, the limiting member 121 and the main body 131 both abut against the first band 140 in the manner of multi-point contact, which can also limit the movement of the first band 140. Alternatively, in other implementations of the present disclosure, the limiting member 121 is not parallel to the main body 131 of the fixing member 130, the limiting member 121, the main body 131, and the end plate 120 cooperatively define one positioning region 101, and the first band 140 may be bent. When the first band 140 is accommodated in the bent positioning region 101, the limiting member 121 and the main body 131 both abut against the first band 140 in the manner of line contact or surface contact, which has relatively great limiting effect. Alternatively, the first band 140 is rectangular, and when the first band 140 is accommodated in the bent positioning region 101, the limiting member 121 and the main body 131 both abut against the first band 140 in the manner of multi-point contact, which can also limit the movement of the first band 140.

Figure 4:
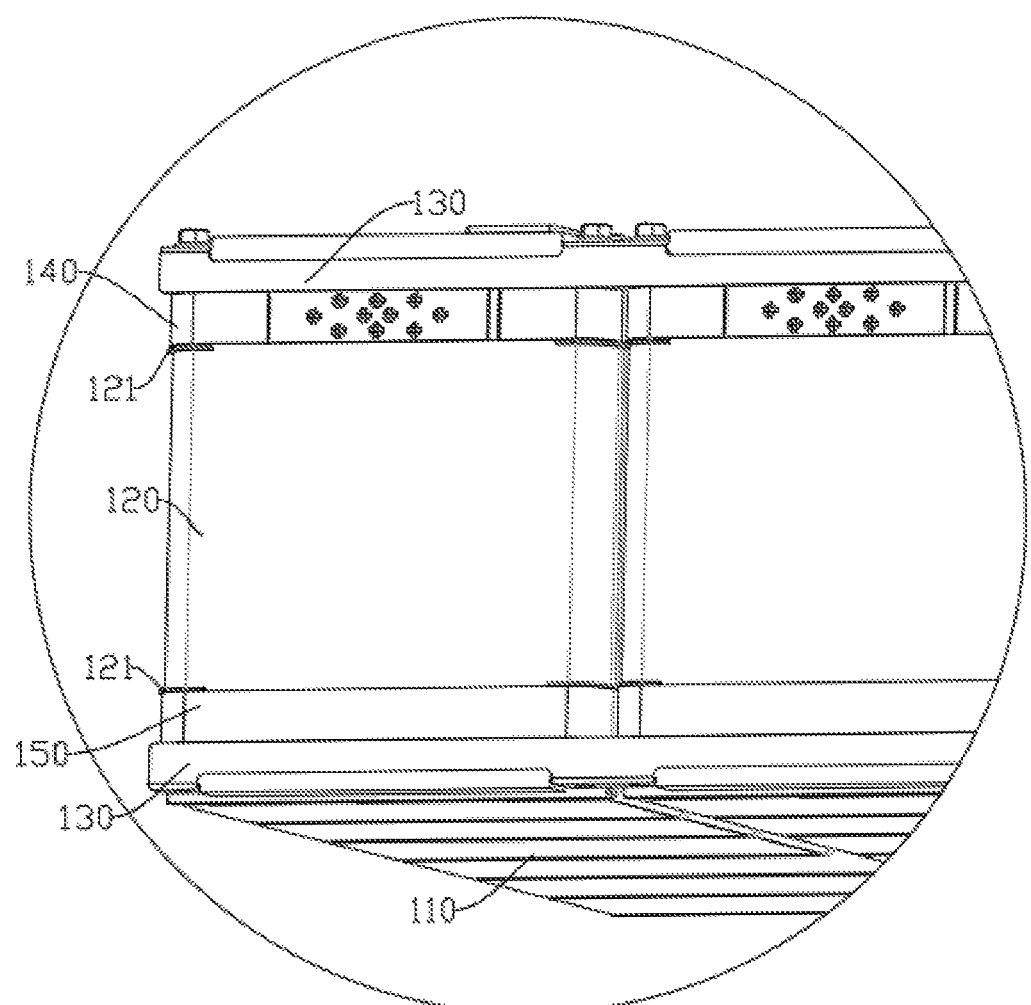
FIG. 4 is local schematic diagram of a battery pack provided in implementations of the present disclosure.

Reference can be made to FIG. 4, which is a local schematic diagram of a battery pack 100 provided in implementations of the present disclosure. In implementations, the battery pack 100 further includes a second band 150.

In implementations, the end plate 120 may be provided with two limiting members 121 spaced apart from each other. The battery pack 100 may include two fixing members 130. The two fixing members 130 may be connected with two ends of the battery module 110 respectively. In other words, one fixing member 130 is configured to be connected with one end of the battery module 110, another fixing member 130 is configured to be connected with another end of the battery module 110.

Accordingly, the two limiting members 121, the two fixing members 130, and the end plate 120 cooperatively define two positioning regions 101. The first band 140 can be adaptively connected with one of the two positioning regions 101, and the second band 150 can be adaptively connected with another of the two positioning regions 101.

In implementations, the first band 140 may be adaptively connected with one of the two positioning regions 101 close to an electrode 111 of the battery module 110, and the second band 150 may be adaptively connected with another of the two positioning regions 101 away from the electrode 111 of the battery module 110. As illustrated in FIG. 1, the electrode 111 of the battery module 110 is located at the top of the battery module 110.

In implementations of the present disclosure, the first band 140 may be made of alloy, such as an aluminum alloy.

The second band 150 may be made of plastic, such as nylon. During manufacturing of the battery pack 100, an end of battery module 110 away from the electrode 111 will be filled with various adhesive agents or adhesive glues. Therefore, the battery module 110 can be fastened with the cooperation of the adhesives and the second band 150 made of plastic, which can save manufacturing costs of the second band 150, thereby reducing the weight of the battery pack 100. Since the end of the battery module 110 close to the electrode 111 is not filled materials such as the adhesive gules, etc., the first band 140 made of alloy can have a relatively great fastening effect.

It should be noted that in other implementations of the present disclosure, the first band 140 may also be made of other alloys, and accordingly, the second band 150 may also be not limited to be made of nylon. Alternatively, in other implementations of the present disclosure, the second band 150 may also be made of alloy.

Optionally, in implementations of the present disclosure, the first band 140 and the second band 150 have the same size. It should be noted that in other implementations of the present disclosure, the second band 140 and the second band 150 may have different shapes and sizes. Accordingly, the two positioning regions 101 may also have different shapes and sizes, and limiting members 121 constituting the two positioning regions 101 may also have different shapes and sizes.

It should be noted that in other implementations of the present disclosure, the end plate 120 may only be provided with one limiting member 121. Accordingly, the limiting member 121 and the fixing member 130 define one positioning region 101 for adapting to the first band 140.

The battery pack 100 provided in implementations of the present disclosure at least includes following advantages.

The positioning region 101 for limiting the first band 140 is cooperatively defined by the fixing member 130, the limiting member 121, and the end plate 120, and the movement of the first band 140 relative to the end plate 120 is limited by the positioning region 101. After the battery pack 100 shrinks or expands, the positioning region 101 can make the first band 140 and the end plate 120 relatively fixed to prevent the first band 140 from falling off. In the present disclosure, the fixing member 130 can connect the multiple battery modules 110 and abut against the first band 140, so as to avoid disposing more limiting members 121 on the end plate 120, thereby reducing manufacturing costs.

Reference can be made to FIG. 1 to FIG. 4 together, and a fixing assembly for a battery module is further provided in implementations of the present disclosure, which is mainly configured to connect the multiple battery modules 110 to constitute the battery pack 100.

The fixing assembly for the battery module includes an end plate 120, a fixing member 130, and a first band 140. As for structures and constructions of the end plate 120, the fixing member 130, and the first band 140, reference can be made to the above illustration.

Optionally, in some implementations, the fixing assembly for the battery module may further include a second band, and as for the structure and construction of the second band 150, reference can be made to the above illustration.

Accordingly, in implementations of the present disclosure, the fixing assembly for the battery module may have multiple states, such as a state where the end plate 120, the fixing member 130 and the first band 140 are not connected with each other, and a state where the end plate 120, the fixing member 130, and the first band 140 are connected with the battery module 110 to form the battery pack 100. As for the state where the end plate 120, the fixing member 130, and the first band 140 are connected with the battery module 110 to form the battery pack 100, reference can be made to the main structures of the above battery pack 100, which will not be repeated in implementations.

The fixing assembly for the battery module provided in implementations of the present disclosure at least has following advantages.

When all components in the fixing assembly for the battery module are mutually connected, the fixing member 130 can connect the multiple battery modules 110 and abut against the first band 140. The fixing member and 130 the limiting member 121 cooperatively limit the movement of the first band 140 relative to the end plate 120, which can avoid a situation where the first band 140 falls off after the battery module 110 shrinks or expands.

Optionally, a movement of the second band 150 can also be limited by the fixing member 130, avoiding manufacturing of limiting members 121 for limiting the second band 150, thereby reducing manufacturing costs, reducing the weight of the battery pack 100, and improving mass density.

The above descriptions are only preferred implementations of the present disclosure, and are not used to limit the present disclosure. For those of ordinary skill in the art, the present disclosure may have various changes and variations. Any modification, equivalent replacement, improvement, etc. made within the spirit and principles of the present disclosure shall be included in the scope of protection of the present disclosure.

The fixing assembly for the battery module and the battery pack are provided in the present disclosure. When all components in the fixing assembly for the battery module are mutually connected, the fixing member and the limiting member cooperatively limit the movement of the first band relative to the end plate, which can avoid the situation where the first band falls off after the battery module shrinks or expands. In addition, the positioning region for limiting the first band can be cooperatively defined by the fixing member, the limiting member, and the end plate, and the movement of the first band relative to the end plate can be limited by the positioning region. After the battery pack shrinks or expands, the fixing member and the limiting member can make the first band and the end plate relatively fixed to prevent the first band from falling off. In the present disclosure, the fixing member can connect the multiple battery modules and abut against the first band, so as to avoid disposing more limiting members on the end plate, thereby reducing the manufacturing costs.

In addition, it can be understood that the fixing assembly for the battery module and the battery pack of the present disclosure can be reproduced and can be used in a variety of industrial applications. For example, the fixing assembly for the battery module and the battery pack of the present disclosure can be applicable to any component which can fix the battery module by binding with the band.

What is claimed is:

1. A fixing assembly for a battery module, comprising:
   an end plate, the end plate being configured to abut against an outer sidewall of the battery module and provided with a limiting member protruding from a surface of the end plate, wherein the battery module comprises a plurality of battery cells;
   a fixing member, wherein the fixing member and the end plate are disposed in a split manner, the fixing member comprises a main body and at least one connecting portion connected with the main body, each of the at least one connecting portion is configured to connect and be attached to two adjacent battery modules in a plurality of battery modules, and the main body abuts against the surface of the end plate provided with the limiting member, such that the main body, the limiting member, and the end plate cooperatively define a positioning region; and a first band, the first band being configured to abut against the surface of the end plate provided with the limiting member to bind the plurality of battery cells of the battery module, and the first band abutting against the positioning region, such that both the fixing member and the limiting member abut against the first band.

2. The fixing assembly for the battery module of claim 1, comprising two fixing members and a second band, wherein
the two fixing members are respectively configured to be connected with two opposite ends of the battery module, and the end plate is provided with two limiting members at a same side of the end plate; and
one of the two limiting members, one of two main bodies, and the end plate cooperatively define one positioning region, and the first band and the second band are respectively configured to be adaptively connected with the two positioning regions.

3. The fixing assembly for the battery module of claim 2, wherein
the first band is made of alloy, and the second band is made of plastic; and
the first band is adaptively connected with the positioning region close to an electrode of the battery module.

4. The fixing assembly for the battery module of claim 1, wherein the end plate has a chamfer recessed toward the battery module at each of two opposite ends of the end plate, and the end plate is provided with the limiting member at each of the two chamfers.

5. The fixing assembly for the battery module of claim 1, wherein the end plate has a chamfer recessed toward the battery module at each of two opposite ends of the end plate, and the end plate is provided with the limiting member at only one chamfer.

6. The fixing assembly for the battery module of claim 2, wherein the end plate has a chamfer recessed toward the battery module at each of two opposite ends of the end plate, and the end plate is provided with the limiting member at each of the two chamfers.

7. The fixing assembly for the battery module of claim 2, wherein the end plate has a chamfer recessed toward the battery module at each of two opposite ends of the end plate, and the end plate is provided with the limiting member at only one chamfer.

8. The fixing assembly for the battery module of claim 1, wherein the limiting member is elongated, and the limiting member extends in a direction parallel to a direction in which the first band extends.

9. The fixing assembly for the battery module of claim 2, wherein the limiting member is elongated, and the limiting member extends in a direction parallel to a direction in which the first band extends.

10. The fixing assembly for the battery module of claim 3, wherein the limiting member is elongated, and the limiting member extends in a direction parallel to a direction in which the first band extends.

11. The fixing assembly for the battery module of claim 1, wherein the limiting member comprises a plurality of protrusions spaced apart from one another, and each of the plurality of protrusions abuts against the first band after the first band is connected with the end plate.

12. The fixing assembly for the battery module of claim 1, wherein in a direction perpendicular to the end plate, a height of the limiting member is equal to a thickness of the first band.

13. The fixing assembly for the battery module of claim 1, wherein the main body is elongated, and the connecting portion is connected with one end of the main body, such that the main body is in contact with the surface of the end plate and the connecting portion is in contact with the battery modules.

14. The fixing assembly for the battery module of claim 1, wherein a width of the positioning region is adapted to a width of the first band, such that both the limiting member and the fixing member abut against the first band.

15. The fixing assembly for the battery module of claim 1, wherein the main body is a bent strip-shaped sheet, and at least part of the main body abuts against the first band after the fixing member is connected with the battery module.

16. A battery pack comprising:
a plurality of battery modules, wherein each of the plurality of battery modules comprises a plurality of battery cells;
a plurality of end plates, an end plate abutting against an outer sidewall of a battery module and being provided with a limiting member protruding from a surface of the end plate away from the battery module;
a fixing member, wherein the fixing member and the end plate are disposed in a split manner, the fixing member comprises a main body and at least one connecting portion connected with the main body, the main body abuts against the surface of the end plate away from the battery module, and each of the at least one connecting portion is connected with and attached to two adjacent battery modules in the plurality of battery modules, and the main body, the limiting member, and the end plate cooperatively define a positioning region; and
a plurality of first bands, a first band being configured to abut against the surface of the end plate away from the battery module to bind the plurality of battery cells of the battery module, and the first band abutting against the positioning region, such that the fixing member and the limiting member cooperatively limit a movement of the first band.

17. The battery pack of claim 16, comprising a plurality of second bands and two fixing members, wherein
the two fixing members are respectively connected with two opposite ends of the battery module;
the end plate is provided with two limiting members at a same side of the end plate;
one of the two fixing members, one of two main bodies, and the end plate cooperatively define the positioning region;
the first band is adaptively connected with the positioning region close to an electrode of the battery module, and a second band is adaptively connected with another positioning region; and
each of the plurality of first bands is made of alloy, and each of the plurality of second bands is made of plastic.

18. The battery pack of claim 16, wherein the end plate has a chamfer recessed toward the battery module at each of two opposite ends of the end plate, and the limiting member is disposed at the chamfer.

19. The battery pack of claim 16, wherein the limiting member is elongated, and the limiting member extends in a direction parallel to a direction in which the first band extends.

20. The fixing assembly for the battery module of claim 1, wherein the limiting member is disposed on part of the surface of the end plate in an extending direction of the first band.

* * * * *